(12) United States Patent
Spyropoulos et al.

(10) Patent No.: US 9,739,890 B2
(45) Date of Patent: Aug. 22, 2017

(54) GPS BASEBAND CONTROLLER ARCHITECTURE

(75) Inventors: Ioannis Spyropoulos, Carlsbad, CA (US); Anand Anandakumar, Carlsbad, CA (US); Maxime Leclercq, Carlsbad, CA (US); Yves Rasse, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 12/939,543

(22) Filed: Nov. 4, 2010

(65) Prior Publication Data

US 2011/0102257 A1 May 5, 2011

Related U.S. Application Data

(60) Provisional application No. 61/258,171, filed on Nov. 4, 2009.

(51) Int. Cl.
*G01S 19/34* (2010.01)

(52) U.S. Cl.
CPC .................... *G01S 19/34* (2013.01)

(58) Field of Classification Search
CPC ........................................ G01S 19/34
USPC .................................... 342/357.74
See application file for complete search history.

(56) References Cited

U.S. PATENT DOCUMENTS

| 4,147,891 A * | 4/1979 | Roos ............................. 375/364 |
| 5,359,521 A * | 10/1994 | Kyrtsos et al. ................ 701/470 |
| 5,592,173 A * | 1/1997 | Lau et al. ................. 342/357.74 |
| 6,327,535 B1 * | 12/2001 | Evans et al. ................... 701/300 |
| 8,566,022 B1 * | 10/2013 | Starenky et al. .............. 701/410 |
| 2001/0040627 A1 * | 11/2001 | Obradovich ..... G08G 1/096716 348/222.1 |
| 2003/0003943 A1 * | 1/2003 | Bajikar ......................... 455/550 |
| 2003/0016170 A1 * | 1/2003 | Jandrell .................... 342/357.12 |
| 2003/0083814 A1 * | 5/2003 | Gronemeyer ........... G01S 19/23 701/478 |
| 2004/0192346 A1 * | 9/2004 | Chang et al. .............. 455/456.1 |

(Continued)

OTHER PUBLICATIONS

Unraveling the GPS Mystery, T.S. Stombaugh et al., Ohio State University Fact Sheet AEX-560-99, http://ohioline.osu.edu/aex-fact/0560.html, p. 1-5, Dec. 2001.*

(Continued)

*Primary Examiner* — Bernarr Gregory
*Assistant Examiner* — Fred H Mull
(74) *Attorney, Agent, or Firm* — Kilpatrick Townsend & Stockton LLC (57) ABSTRACT

A GPS receiver includes an RF front end for acquiring and tracking a satellite signal and a baseband processor configured to preserve power. The baseband processor includes a GPS engine configured to process the satellite signal and generate a PVT fix, a power supervisory module for receiving the PVT fix, and a user state module that determines an environmental state, wherein the power supervisory module may power down the GPS receiver for a period of time based on a result of the determined environment state. The baseband processor also includes a time-based management module that adjusts the TCXO in response to the determined environmental state. The GPS receiver includes a plurality of operation modes, each of which is associated with a plurality of tracking profiles.

12 Claims, 9 Drawing Sheets

(56) References Cited

U.S. PATENT DOCUMENTS

| | | | |
|---|---|---|---|
| 2004/0252052 A1* | 12/2004 | Kitatani | G01S 19/34 342/357.62 |
| 2005/0275587 A1* | 12/2005 | Siegel et al. | 342/357.06 |
| 2006/0038719 A1 | 2/2006 | Pande et al. | |
| 2006/0149984 A1* | 7/2006 | Yasumoto | G01S 19/23 713/322 |
| 2006/0211430 A1* | 9/2006 | Persico | 455/456.1 |
| 2007/0146129 A1* | 6/2007 | Sun | 340/539.13 |
| 2007/0155341 A1* | 7/2007 | Haiut | H03L 1/026 455/75 |
| 2007/0285309 A1* | 12/2007 | Atkinson | G01S 19/235 342/357.62 |
| 2008/0001744 A1* | 1/2008 | Batra | G06F 1/14 340/572.1 |
| 2009/0045945 A1* | 2/2009 | Yeh | G01S 19/34 340/539.13 |
| 2009/0047979 A1* | 2/2009 | Oh et al. | 455/457 |
| 2009/0102713 A1 | 4/2009 | Sanchez et al. | |
| 2009/0168843 A1 | 7/2009 | Waters et al. | |
| 2010/0234038 A1* | 9/2010 | Thandu et al. | 455/450 |
| 2010/0250129 A1* | 9/2010 | Babitch et al. | 701/213 |
| 2010/0295623 A1* | 11/2010 | Gronemeyer | G01S 19/23 331/44 |
| 2011/0066874 A1* | 3/2011 | Shen | H04W 52/028 713/400 |
| 2011/0187462 A1* | 8/2011 | Sonntag | H03L 7/00 331/34 |
| 2011/0261227 A1* | 10/2011 | Higaki | G01S 19/34 348/231.5 |

OTHER PUBLICATIONS

International Search Report and Written Opinion corresponding to the PCT application No. PCT/US2010/055492, date of mailing Jan. 6, 2011, 8 pages total.

International Preliminary Report on Patentability corresponding to International Patent Application No. PCT/US2010/055492, mailed May 18, 2012, 7 pages.

* cited by examiner

GPS BASEBAND CONTROLLER ARCHITECTURE

CROSS-REFERENCES TO RELATED APPLICATIONS

The present application claims benefit under 35 USC 119(e) of U.S. provisional application No. 61/258,171, filed Nov. 4, 2009, entitled "MSC System Architecture," the content of which is incorporated herein by reference in its entirety.

BACKGROUND OF THE INVENTION

The present invention relates to power control devices and methods, and more particularly, to system architectures and algorithms utilized in GPS receivers.

The Global Positioning System (GPS) is a satellite-based navigation system that requires low power in order to preserve battery life in handheld applications. There are currently three GPS systems: the NAVSTAR Global Positioning System controlled by the United States Defense Department; the GLONASS maintained by the Russian Republic; and the GALILEO system proposed in Europe.

To decode satellite signals, a GPS receiver must first acquire the signals transmitted by a minimum number of satellites. The GPS receiver calculates its position by measuring the distance between itself and the minimum number of satellites that are in general more than three. The signals carry information of the position of the satellites. By determining the positions of the satellites and the distances to the satellites, the GPS receiver is able to determine its position using trilateration. The difficulty in preserving power is that hardware components require a continual power supply in order to track and process signals received from the satellites to generate navigation updates at a required rate.

For handheld GPS devices, the size and the associated weight of the battery impose a limit to the compactness of the GPS devices. Hence, a need exists for an improved GPS receiver that offers lower power consumption than conventional techniques.

BRIEF SUMMARY OF THE INVENTION

According to embodiments of the present invention, techniques for preserving power in GPS devices are provided. More particularly, embodiments of the present invention provide structures, algorithms, components, and methods for preserving power in a GPS receiver. But it would be recognized that embodiments of the present invention have a much broader range of applicability.

In an embodiment, a GPS receiver includes an RF front end module configured to acquire and track a satellite signal and a baseband processor that in turns includes a GPS engine configured to process the satellite signal and generate a position, velocity, time (PVT) fix. The baseband processor also includes a power supervisory module configured to receive the PVT fix and a user state module that determines an environmental state of the user application, wherein the power supervisory module may power down the RF front end module and the GPS engine for a period of time based on a result of the determined environment state. In an exemplary application where the user state module detects that the GPS receiver does not move, it may provide an information signal to the power supervisory module to turn off the RF front end and the baseband processor for a time duration.

In another embodiment, the GPS receiver may include a baseband processor having a PVT fix module that is configured to process the PVT fix, assign a position accuracy index to the processed PVT fix, and store the processed PVT fix in a backup memory or in a system memory. The PVT fix module may provide a feedback signal to the power supervisory module, which then turns off a part of or the entire GPS receiver. In an embodiment, the PVT fix module may report the processed PVT fix to a host at a programmable time interval. Whether the entire GPS receiver or a portion thereof is turned off depends from a target accuracy range that is associated with the position accuracy index. In some embodiments, the position accuracy index may have the attributes of high accuracy range, mid accuracy range, and low accuracy range, which may be determined by the number of tracked satellites, the strength of the received signals, and/or others.

The present invention also includes a method for preserving power in a GPS receiver that contains a plurality of functional modules. The method includes receiving a start command from a host at a power supervisory module that then initiates a process of acquiring and tracking a GPS signal from a number of satellites. The method also includes processing the GPS signal to generate a PVT fix that is sent to a PVT fix module for further processing such as assigning a position accuracy index to it. For example, the position accuracy index may include a high position accuracy range, a mid position accuracy range, and a low position accuracy range that can be characterized by a received signal strength of the GPS signal. The method further includes stopping the tracking step when the accuracy index is within a desired or target accuracy range.

In another embodiment, a method of preserving power in a GPS receiver includes receiving a start command from a host at a power supervisory module that then initiates a process of acquiring and tracking a GPS signal from a number of satellites. The method also includes processing the GPS signal to generate a PVT fix that is sent to a PVT fix module for further processing such as assigning a position accuracy index to it. The method further includes determining an environmental state and powering down the GPS receiver for a time period in response to the determined environmental state. In an exemplary embodiment, the environmental state may include a temperature data or a velocity data or other user activities such as switching on or off a host (e.g., a camera), a selected PVT fix rate, and others. In another embodiment, the time period during which the GPS receiver is powered down can be adjusted based on a result of the determined environmental state.

Various embodiments, features, and advantages of the present invention can be more fully appreciated with reference to the detailed description and accompanying drawings that follow.

DETAILED DESCRIPTION OF THE INVENTION

Figure 1:
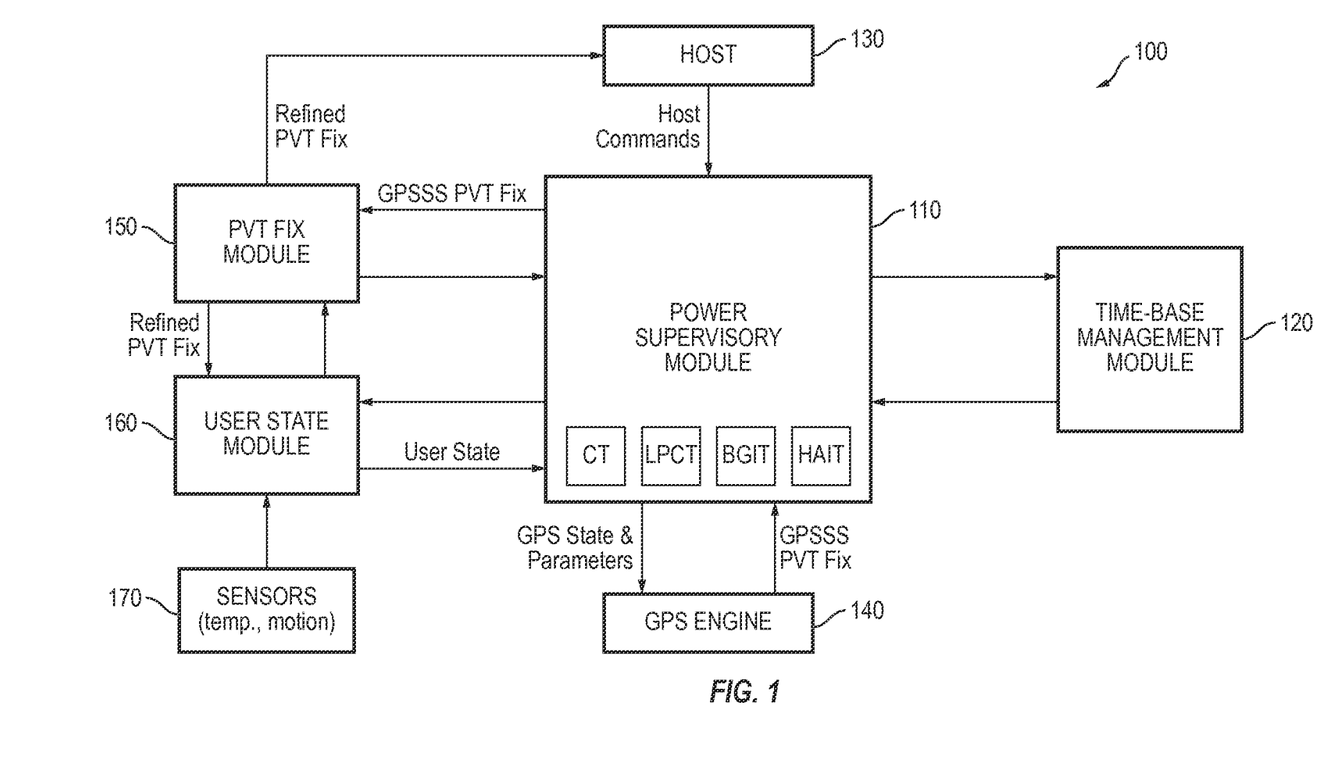
FIG. 1 is a simplified block diagram of a GPS receiver according to an embodiment of the present invention.

FIG. 1 is a simplified block diagram of a GPS receiver 100 according to an embodiment of the present invention. GPS receiver 100 includes a plurality of functional modules. In an embodiment, the GPS receiver may include a radio frequency (RF) front end module (not shown) that acquires and tracks a RF signal from a minimum number of satellites and down-converts the RF signal to an IF signal. An analog-to-digital-converter module (not shown) digitizes the IF signal and provides the digital IF signal to an GPS engine 140. GPS engine 140 produces a Position, Velocity, Time (PVT) fix and provides the PVT fix to a power supervisor module 110. Power supervisor module 110 passes the PVT fix to a PVT fix module 150 that processes the PVT fix to potentially enhance its quality (e.g., by means of sensor-assisted or non-sensor-assisted position filtering, etc), stores the processed PVT fix, and assigns a position accuracy index to it. In an embodiment, the position accuracy index may assign an attribute to the PVT fix based on the position accuracy, the velocity accuracy, the time accuracy, or a combination thereof. The attribute can be a high, mid, or low accuracy value. In an embodiment, PVT fix module 150 may also provide the power supervisory module with the time period to a next regular PVT fix. The time period may be adjusted depending from a desired or target position accuracy range. For example, when the target position accuracy index is low (e.g., 50 m) and the target accuracy index is met, the PVT fix module may provide a signal to the power supervisory module that stops tracking the GPS signal to preserve power.

The GPS receiver further includes a user state module 160 that determines a current user or environmental state based on inputs such as the received signal level, the noise profile, the ambient or operating temperature of the GPS receiver, the velocity or a location of the GPS receiver (e.g., indoor or outdoor). The user state module may detect or monitor user activity in case the user operates a device that has the GPS receiver built in, such as a camera, personal navigation device, etc. The user state module then provides the state information to the power supervisory module.

In an embodiment, the user state module is connected to a sensor or a plurality of sensing circuits 170. In an embodiment, sensor 170 can be an acceleration sensing chip. The acceleration sensing chip can be an integrated circuit embedded within the user state module in a specific embodiment. When the accelerator sensing circuit senses that the GPS receiver is not moving, it sends a non-moving information signal to the power supervisor module, which may power-down the RF front end for a period of time to save power. And the power supervisory module may wake up the RF front end module after a predetermined time period to assume the tracking the GPS signal of the satellites. Similarly, if the GPS receiver receives information signal from the accelerator sensing circuit that it is moving at a constant speed, it may also power down the RF front end to save power. In some embodiments, the complete GPS receiver may be powered down, not only the RF front end, but also other selected parts of the GPS receiver so that only the sensing circuit and a backup memory for storing PVT fix data are powered. The sensing circuit continues detecting the variation of the acceleration of the GPS receiver. If the accelerator sensing device detects an acceleration value that exceeds a threshold value, it informs the power supervisory module to reacquire satellites.

In another embodiment, sensor 170 may measure a temperature drift since the last PVT fix and enable the local oscillator frequency of the GPS receiver to be adjusted or compensated for the temperature drift while the GPS receiver is powered down.

In an embodiment, the GPS receiver may include a time-base management module 120 that keeps track of the precision (in ppm) of the system clock frequency and ensures that the frequency of the temperature-compensated crystal oscillator (TCXO) that is used to generate the system clock is within a range required for the operation of the GPS engine.

In an embodiment, the power supervisor module may wake up and instruct the GPS receiver to perform acquisition, tracking, and/or PVT calculation. In another embodiment, the power supervisory module may receive instructions from a host 130 to wake up the GPS receiver. Host 130 can be a camera, laptop, or other device that changes its state (e.g., power up, power down). In an embodiment, the power supervisor module may be a general-purpose microcontroller that performs some functions of a PVT fix module or functions of a group of modules such as the user state module and/or the time-base management module. The functions can be implemented in a form of program codes that are stored in a computer-readable media that can be accessed by a general-purpose or special purpose processor. By way of example, and not limitation, such computer-readable media can include RAM, ROM, EEPROM, or Flash memory.

In another embodiment, the power supervisory module and other modules may be implemented using field programmable gate array (FPGA), application specific integrated circuit (ASIC) chip or chipsets. In terms of a practical hardware implementation of such chip or chipsets, digital ASICs are preferred.

Figure 2:
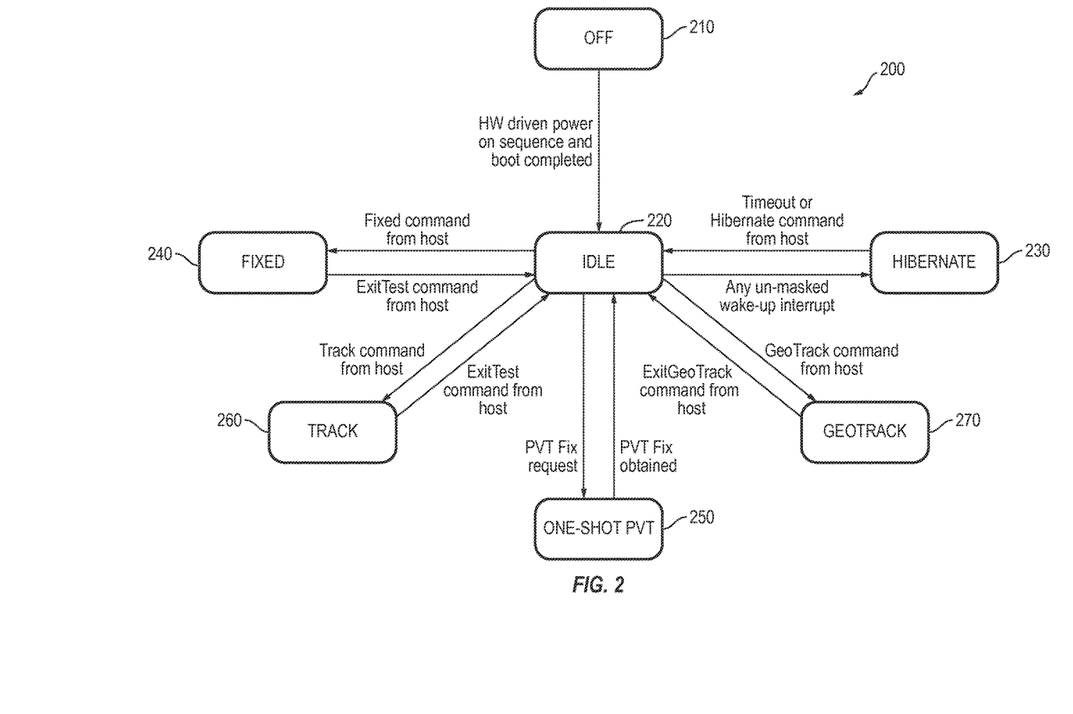
FIG. 2 is a state diagram illustrating exemplary operation modes of a GPS receiver according to embodiments of the present invention.

FIG. 2 is a state diagram 200 illustrating exemplary operation modes of a GPS receiver according to embodiments of the present invention. The GPS receiver is initially in a power off state 210. At power up, the GPS receiver enters an Idle state or Idle mode 220 and waits for a command from a host. If no command from the host is received with a predetermined time period, the receiver transitions to a Hibernate mode 230 to conserve power. The Hibernate mode is the lowest power mode, in which all modules with the exception of a backup memory and system memory, are powered down. The GPS receiver remains in the Hibernate mode until it receives a wake-up signal (e.g., an interrupt from the host). The GPS receiver can enter other operation modes such as a Fixed mode 240. While the GPS receiver is in the Fixed mode, the host can explicitly configure the GPS receiver to operate in a specific tracking profile having specific parameters. The specific tracking profile and the associated parameters will be described in more detail below.

As shown in FIG. 2, the GPS receiver may enter a ONE-SHOT PVT mode 250. The GPS receiver may transition from the Idle mode to the ONE-SHOT PVT mode when it receives a request from the host. Cold, warm, or hot start may be performed depending on the GPS receiver status (i.e., whether or not valid almanac, ephemeris, and reference time and position are available in the back-up memory or in the system memory). Cold start may be defined as a system state where the GPS receiver has no information about the last position and the current time. For example, the power supply of the backup memory or system memory may have been removed or shut off. The GPS receiver may have a warm start when its last position and current time are known at known at start-up, and the almanac data is valid, but the ephemeris data are not available or outdated (e.g., older than 4 hours). The GPS receiver may have a hot start when its last position and current time are known at start-up, and the almanac and ephemeris data are valid. After the GPS receiver obtains a PVT fix and provides it to the host, the GPS receiver may return to the Idle mode and wait for a next command from the host.

Figure 3:
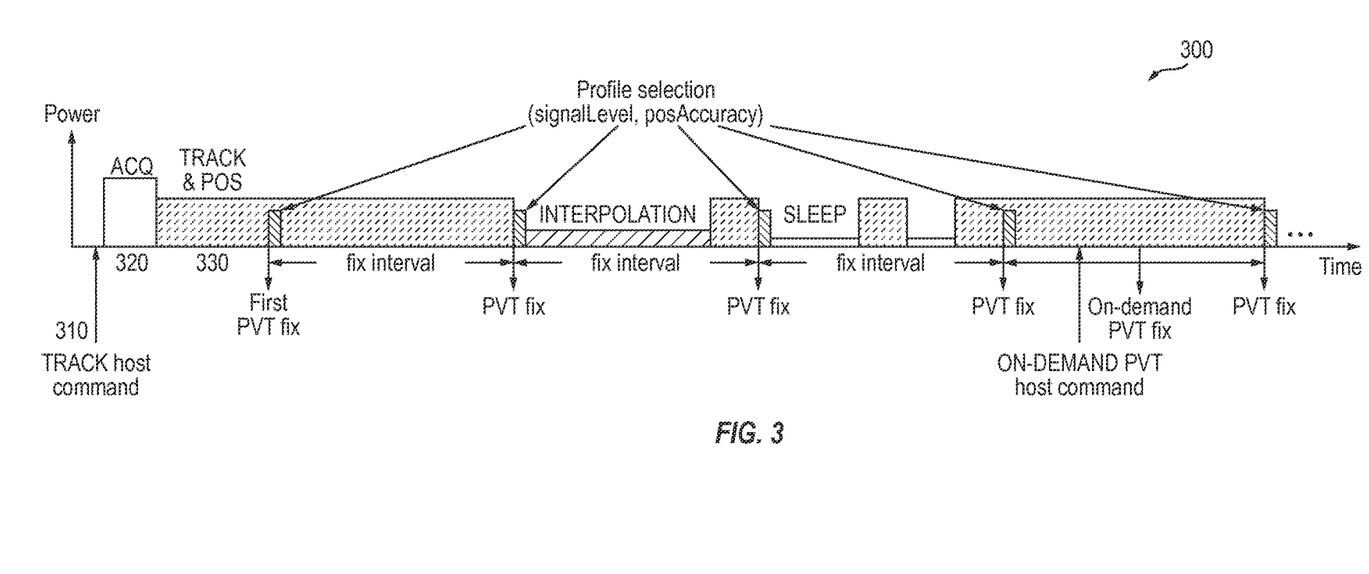
FIG. 3 is a simplified schematic timing diagram illustrating an exemplary track mode operation according to an embodiment of the present invention.

The GPS receiver may enter a Track mode 260 or a Geotrack mode 270 from the Idle mode state. FIG. 3 is a simplified schematic timing diagram 300 illustrating an exemplary track mode operation according to an embodiment of the present invention. At time 310, the GPS receiver may receive a "track" command from a host and initiates the acquisition mode where a radio frequency (RF) signal from a plurality of satellites is received (time period 320). The acquisition phase at 320 may be considered as completed when the correlation between the received GPS signal and a stored PRN code corresponding to a satellite is high. Then the acquisition phase is switched to the tracking phase. The tracking phase (interval 330) is considered validated when the carrier offset tracking and the code phase tracking loops are in lock and a first valid pseudo range, position, velocity, time fix is obtained. The GPS receiver may provide PVT fixes at regular programmable time or space intervals to the host. Per fix time interval, a tracking profile and its duty cycle are adaptively selected so that a user-specified accuracy can be achieved using a minimum power. In an embodiment, the tracking profile can be selected from a continuous tracking (CT) profile, a low power continuous tracking (LPCT) profile, and a background intermittent tracking (BGIT) profile.

In the Track mode, the GPS receiver continuously tracks satellites, updates ephemeris data as needed, and produces accurate PVT fixes at regular time or spatial intervals that are programmable. These PVT fixes are then reported to the host or logged in a system memory for future access. In an embodiment, the GPS receiver can provide on-demand PVT fixes upon request from the host within a user-specified time limit and an accuracy range. For example, the Track mode is relevant to applications that require high-sensitivity, accurate, and continuous position tracking One example application of the Track mode is the geotagging that is associated with a specific location corresponding to an acquired media, such as photos, videos, and others.

In an embodiment, the continuous tracking (CT) profile is used in weak signal conditions. The tracking profile can, however, transition to a LPCT or BGIT profile dynamically based on a fix rate and a target position accuracy requested by the host. The CT profile and its duty cycle can adaptively be selected so that, at each signal level, the desired target accuracy can be achieved with the minimum power consumption.

In the Geotrack mode, the GPS receiver continuously tracks the satellites, even when the GPS receiver enters a power preservation time period, in order to maintain hot start conditions. The Geotrack mode enables the GPS receiver to quickly provide a seamless awareness of the position to applications of the host such as geotagging of multimedia content, geo-fencing, geo-alarm, and others. In the Geotrack mode, the GPS receiver may use the background intermittent tacking (BGIT) profile or a high accuracy intermittent tracking (HALT) profile according to a predictive power management algorithm that is designed to achieve the best trade-off between the position accuracy, time-to-fix, and the overall power consumption of the GPS receiver. In an embodiment, the predictive power management algorithm may define three states: the Background state, the Park state, and the Indoor state.

Figure 4A:
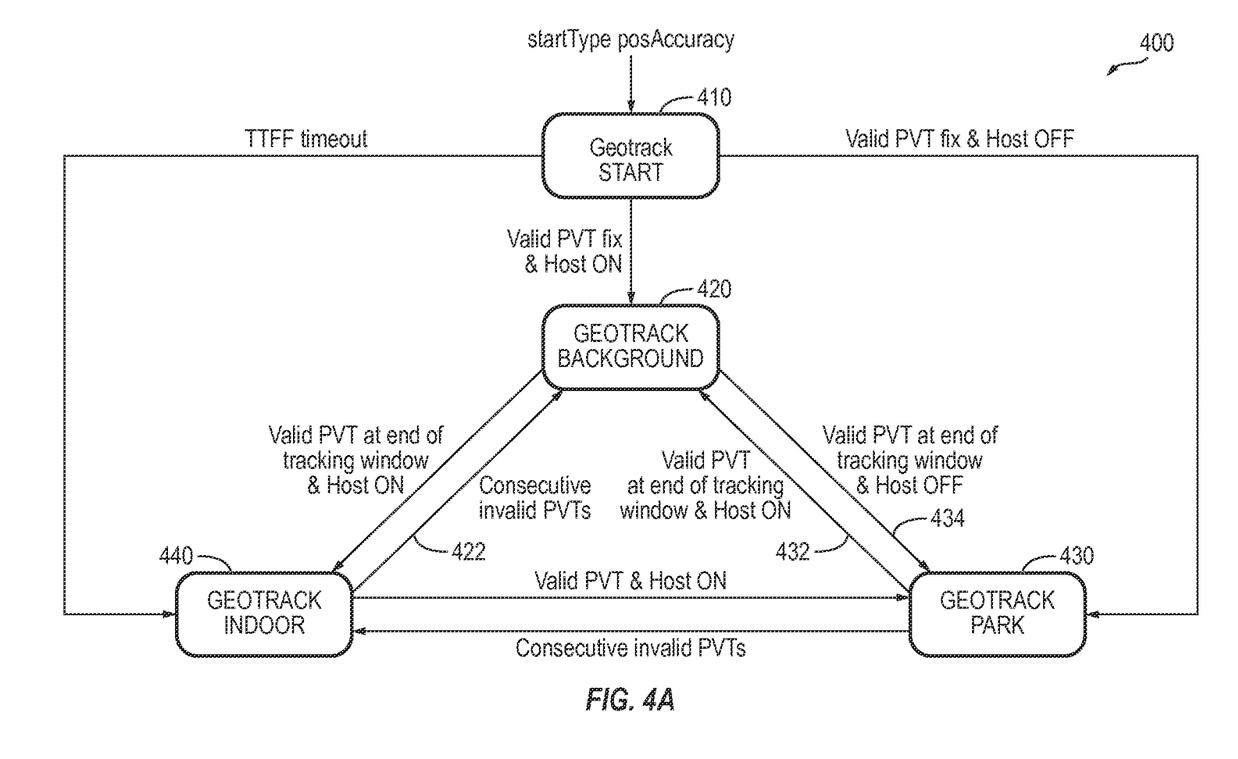
FIG. 4A is a simplified state diagram illustrating an exemplary geotrack mode operation according to an embodiment of the present invention.

FIG. 4A is a simplified state diagram 400 illustrating an exemplary Geotrack mode operation according to an embodiment of the present invention. The predictive power management algorithm initiates the Geotrack mode at 410. The algorithm determines whether or not the host is switched on. In an embodiment, the host may be a camera. In the event that the host is active or on, a Background state 420 is selected to ensure that the GPS receiver will consume the least amount of power while providing a host-specified level of position accuracy. In the event that the host is not active or switched off, a Park state 430 is selected. The Park state 430 will transition (432) to the Background state 420 when the PVT fix is valid at the end of the tracking window and the host is active. Similarly, the Background state 420 will transition (434) to the Park state 430 when the PVT fix is valid at the end of the tracking window with the host switched off or not active.

Also shown in FIG. 4A, the GPS receiver may be set to an Indoor state 440. The Indoor state is entered when the time-to-first-fix (TTFF) is timed out. In this case, the state of the host is not relevant, i.e., the host can be on (active) or off. The Indoor state 440 will be exited when a PVT fix is valid at the end of the tracking window and the host is active. Similarly, when the GPS receiver detects multiple consecutive invalid PVT fixes or very weak signal conditions, the Background state 420 will enter Indoor state 440 (indicated by arrow 422). In the Indoor state, the GPS receiver will have a very long sleep time and will wake up periodically to check whether it can re-acquire the GPS signal, in which case it will switch back to the Background or Park state. While the host is active, the GPS receiver can provide on-demand fixes upon request from the host.

Figure 4B:
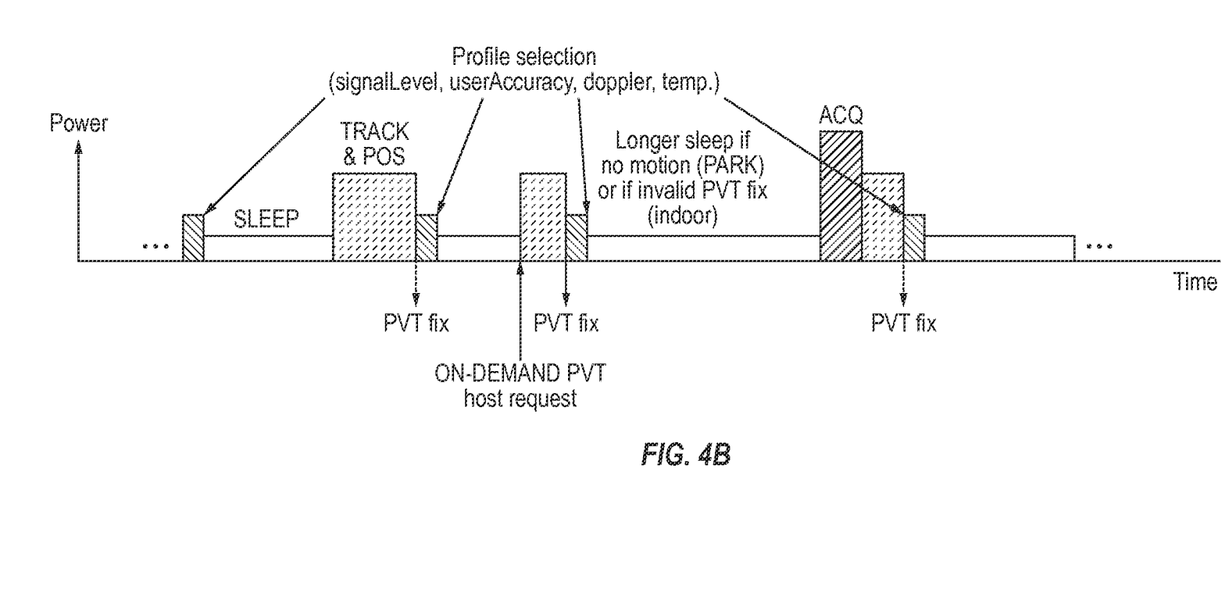
FIG. 4B is a schematic timing diagram illustrating the relative power consumption during different operation modes (acquisition, tracking, sleep) and for different states (Background, Park, Indoor) of FIG. 4A according to embodiments of the present invention.

FIG. 4B is a schematic timing diagram 400A illustrating the relative power consumption during different operation modes (acquisition, tracking, sleep) and for different states (Background, Park, Indoor) according to embodiments of the present invention. Note that the power supervisory module may select an appropriate tracking profile based on the obtained PVT fix. It is also noted that the sleep time can be adjusted based on a user input or an environmental state. In an embodiment, the GPS receiver can dynamically select a tracking profile to maintain hot start at minimum power. The tracking profile can be a Background intermittent tracking (BGIT) profile or a high accuracy intermittent tracking (HAIT) profile. In some embodiments, the different operation modes may include a tracking operation mode that is configured to maintain hot start conditions in the different host states (e.g., a camera, laptop, or personal navigation device, or other device is on or off, user input, etc.). In other embodiments, the different operation modes may include a tracking operation mode that is configured to maintain hot start conditions in the different environmental states (e.g., the GPS receiver is moving at a constant speed, accelerating, or standing still, Doppler effect, or temperature drift, the received GPS signal quality, or other sensor data, etc.). In yet another embodiment, the different operation modes may include a tracking operation mode that is configured to maintain hot start conditions in various combined environmental and host states.

Figure 5:
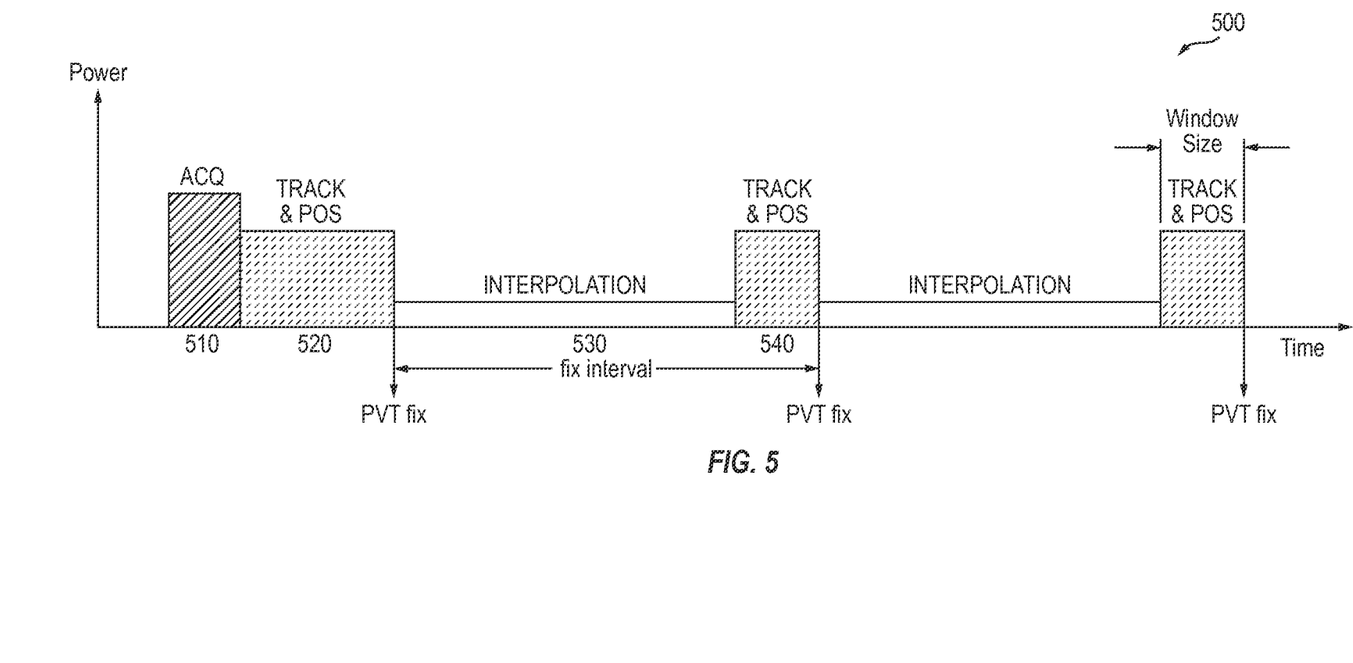
FIG. 5 is a simplified schematic timing diagram illustrating an exemplary low power intermittent tracking operation according to an embodiment of the present invention.

FIG. 5 is a simplified schematic timing diagram 500 illustrating an exemplary low power intermittent tracking profile according to an embodiment of the present invention. In time period 510, the GPS receiver acquires a GPS signal from the available satellites. During time period 520, the GPS receiver tracks code offsets for each available satellite to obtain a valid PVT fix. During time period 530, the GPS receive is in an interpolation mode, where the RF front end module is powered down, so that the local oscillator frequency will maintain its oscillation frequency based on interpolation. In an embodiment, while the GPS receiver is powered down, the local oscillator frequency may be obtained based on a linear interpolation of a number of previously stored frequencies in the system memory. The linear interpolation may be based on the difference of current measured temperature and the temperature at the time the previously frequencies were measured. For example, in an embodiment, the previously measured TCXO frequencies or their frequency difference in association with the measured temperature are stored in a table, which can be saved in a local memory. In another embodiment, a curve of the frequency change as a function of the temperature change can be stored. In yet another embodiment, the frequency change vs. the temperature change can be expressed as multiple affine functions or presented as a polynomial function. In some embodiments, the power supervisory module may decide the window size of tracking based on a range of factors including velocity or estimated acceleration, measured temperature drift since the last fix, quality of the GPS signal, or user-specified accuracy range.

Figure 6:
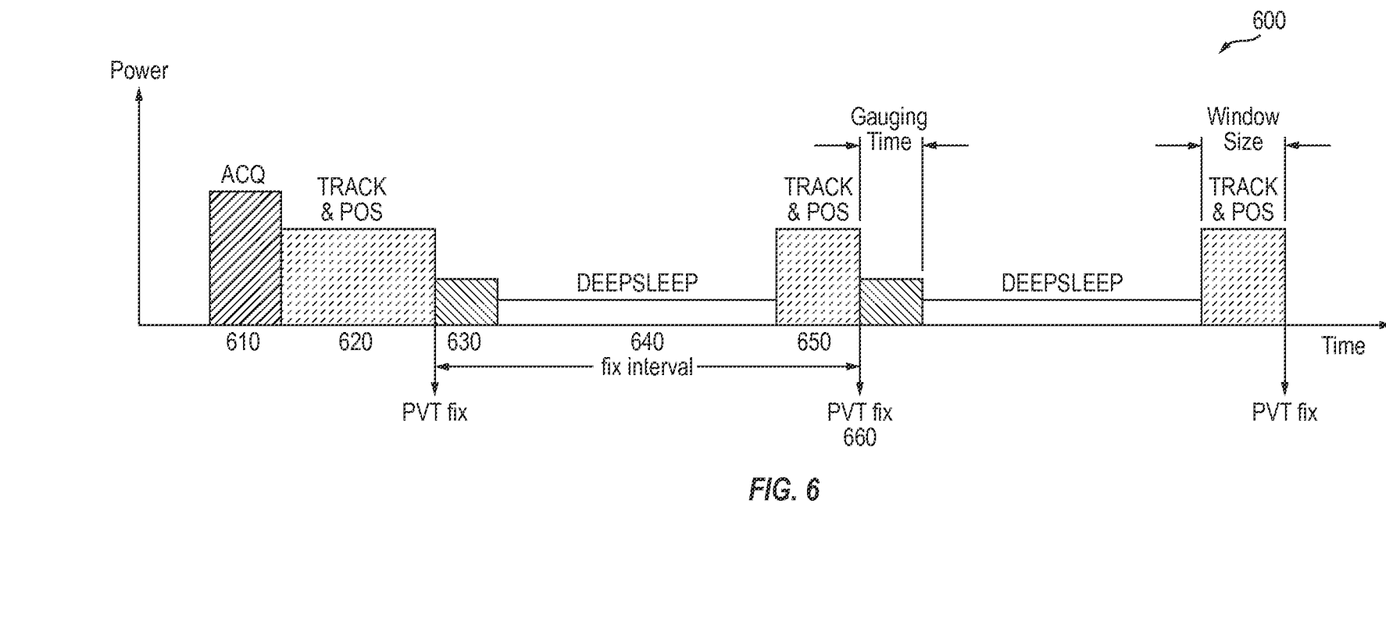
FIG. 6 is a simplified schematic timing diagram illustrating an exemplary background intermittent tracking operation according to an embodiment of the present invention.

FIG. 6 is a simplified schematic timing diagram illustrating an exemplary background intermittent tracking profile according to an embodiment of the present invention. This diagram shows that upon completion of a successful acquisition phase (time interval 610), the GPS receiver enters a tracking phase (time interval 620). The tracking phase is completed when tracking loops are in lock, and there is a valid PVT fix. During time interval 630, a calibration of a 32 kHz RTC clock is performed. The background intermittent tracking mode provides the most power savings as the entire GPS receiver enters the deep-sleep mode where every components with the exception of the 32 kHz real time clock (RTC) are powered down. Real time clock typically operates with a separate small battery to keep track of time and totally independent from the GPS receiver. In an exemplary embodiment, the gauging of the 32 kHz RTC frequency comprises a gauging timer including two 32-bit binary counters. The first binary counter is running on the 32 kHz clock while the second binary counter is running on the local frequency oscillator clock. When the gauging process is triggered (e.g., by software), both binary counters start simultaneously. The gauging process ends when the first binary counter reaches a predetermined count, which, in an embodiment, is software programmable. Both binary counters then stop simultaneously on the last edge of the 32 kHz clock, and an interrupt is generated to a CPU, which then read the number of high frequency clock cycles elapsed during the gauging process and estimate the drift error and relative accuracy of the 32 kHz RTC frequency.

Figure 6A:
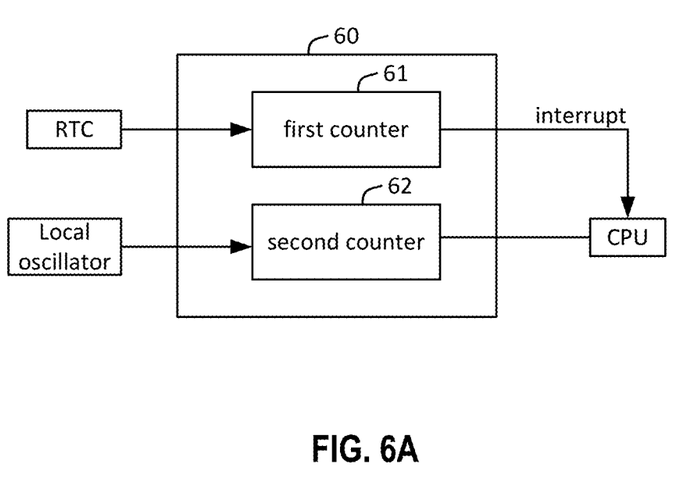
FIG. 6A is a simplified block diagram of a gauging circuit according to an embodiment of the present invention.

FIG. 6A is a simplified block diagram of a gauging circuit 60 according to an embodiment of the present invention. As shown, gauging circuit 60 includes a first binary counter 61 having an input terminal connected to a real time clock (RTC) and an output terminal for outputting an interrupt signal to a CPU when the first binary counter reaches a predetermined count. Gauging circuit 60 also includes a second binary counter 62 having an input terminal connected to a local oscillator and an output terminal connected to the CPU, which reads the content of the second binary counter in response to the received interrupt signal.

In time interval 640, the GPS receiver is completed powered down with the exception of the backup or system memory that stores the hot start data that is used together with the calibrated RTC for obtaining a PVT fix (at time 660) with a short tracking phase (time interval 650). Thus, the calibrated RTC clock is used to improve speed and sensitivity for the acquisition and tracking and the subsequent PVT fixes when the GPS receivers wakes up form the deep-sleep mode.

In an embodiment, the maximum interpolation time or sleep time can be calculated using the expression:

$$p \cdot \tau^2 + 2 \cdot (\eta + 0.01/3 \cdot v) \cdot \tau - \frac{1}{1.023} = 0$$

where:
p is the ppm rate of change for the TCXO in the low-power continuous tracking profile or for the RTC in the background intermittent tracking profile if the TCXO ppm drift is ignored;
η is the code NCO frequency resolution in ppm (or parts in million); and
v is the velocity of the GPS receiver in m/s.

Figure 7:
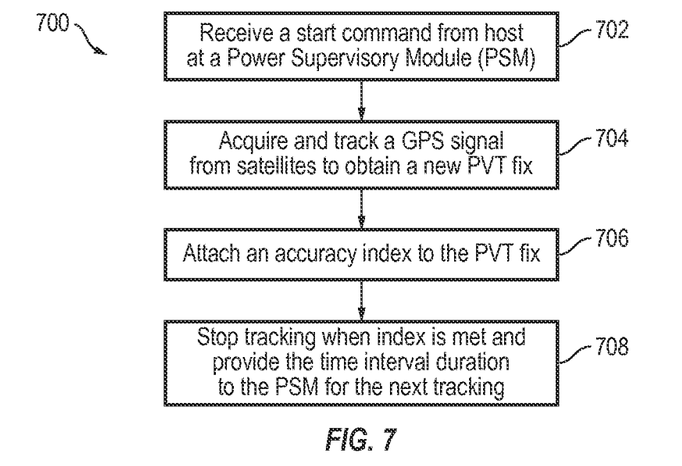
FIG. 7 is a flow chart of steps of a method of preserving power in operating a GPS receiver according to an embodiment of the present invention.

FIG. 7 is a flow chart of steps of a method 700 of preserving power in operating a GPS receiver according to an embodiment of the present invention. The method 700 may be embodied as an article of manufacture that performs the steps and controls the different power supply modules associated with the corresponding hardware or firmware modules in the GPS receiver. In 702, the host issues a start command to the power supervisory module (PSM) that in turn instructs the RF front end of the GPS receiver to acquire and track a GPS signal and provide at least a GPS position, velocity and time (PVT) fix. The PSM sends the PVT fix to the PVT fix module (PFM) that processes the PVT fix (e.g., by guestimate, position filtering, dead-reckoning, etc.), attaches a position accuracy index to it, and reports it to the host. The PFM also stores the latest PVT fix in a backup or system memory (step 706). The PFM evaluates the conditions of the PVT fix against a target position index range. In the event that the index range is met, the PFM will send a signal to the PSM, which in turn stops the tracking process and powers down the GPS receiver. The PFM also provides the time interval to the PSM for the next tracking (step 708).

In an embodiment, the position accuracy index may include a user-defined high accuracy range, a mid accuracy range, and a low-accuracy range that depend from the number of tracking loops used or the number of satellites visible to the GPS receiver or the received signal strength of the GPS signal.

Figure 8:
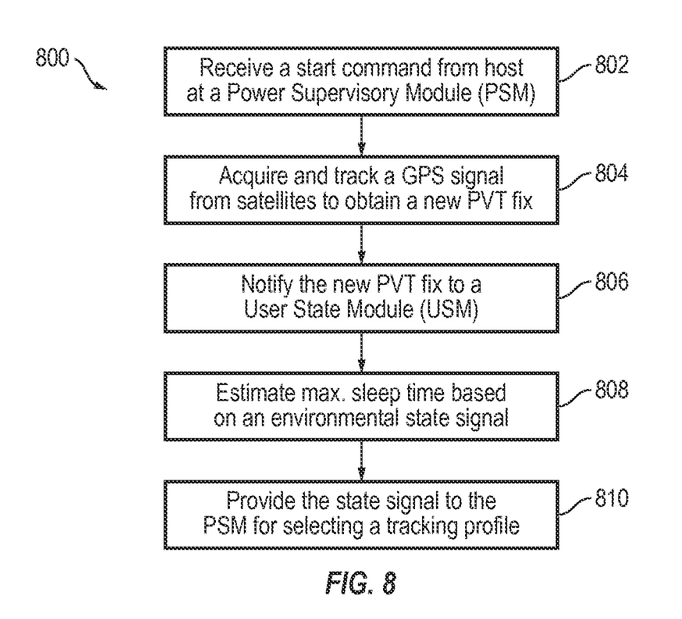
FIG. 8 is a flow chart of a method of preserving power in operating a GPS receiver according to another embodiment of the present invention.

FIG. 8 is a flow chart of steps of a method 800 of preserving power in operating a GPS receiver according to an embodiment of the present invention. The method 800 may be embodied as an article of manufacture that performs the steps and controls the different power supply modules associated with the corresponding hardware or firmware modules in the GPS receiver. In step 802, the power supervisory module receives a start command from the host and initiates an acquisition and tracking operation at the GPS receiver for obtaining at least a PVT fix (step 804). The power supervisory module sends the PVT fix to a user state module at step 806 that estimates a maximum sleep time (i.e., power-down time period) for the GPS receiver. The sleep time is adjustable depending on different environmental states such as the estimated velocity or acceleration of the GPS receiver (whether the GPS receiver is not moving, moving at a slow speed, at a fast speed, or at a constant speed), the temperature of the environment for correcting the drift of the temperature-compensating crystal oscillation (TCXO) at step 808. The user state module then sends the environmental state information data back to the power supervisory module at step 810.

Methods as described above may be implemented, for example, by operating the baseband processor to execute a sequence of machine-readable instructions. These instructions may reside in various types of signal-bearing media. In an embodiment, the signal-bearing medium may comprise RAM, ROM, EPROM, EEPROM, or Flash memory. In an embodiment, the machine readable instructions may comprise lines of compiled C, or C++, or other suitable programming or coding languages commonly used by those skilled in the art.

While the embodiments and advantages of the present invention have been depicted and described, it will be understood by those skilled in the art that many changes in construction and differing embodiments and applications of the invention will suggest themselves without departing from the spirit and scope of the invention. Thus, the disclosure and description herein are purely illustrative and are not intended to be in any sense limiting.

What is claimed is:

1. A method of reducing power consumption in a GPS receiver comprising a gauging circuit including a first counter running on a clock of a real time clock and a second counter running on a clock of a local oscillator having a clock frequency higher than a clock frequency of the real time clock, the method comprising:

acquiring and tracking a GPS signal, by the GPS receiver, from a number of satellites to obtain a PVT fix;

determining an environmental state by the GPS receiver;

assigning an accuracy index characterized by a number of received GPS signals, by the GPS receiver, to the obtained PVT fix;

selecting, by the GPS receiver, a tracking profile from a plurality of tracking profiles in accordance with the determined environmental state and in response to a feedback signal in order to maintain the accuracy index within a predefined range, wherein the tracking profile is associated with a tracking operation mode configured to provide the PVT fix to a host at a regular time or space interval within the predefined range of the target accuracy;

operating the gauging circuit of the GPS receiver;

simultaneously stopping the first and second counters when the first counter reaches a predetermined count; and calibrating the real time clock based on a number of clock cycles counted in the second counter, wherein, at power up, the GPS receiver enters in a hibernate mode where the GPS receiver is powered down except a backup memory and a system memory when the GPS receiver does not receive a command from the host within a predetermined time period, the method further comprising:

waking up the GPS receiver from the hibernate mode by sending a wake-up signal to the GPS receiver by the host.

2. The method of claim 1, wherein the accuracy index is characterized by the strength of the received GPS signals.

3. The method of claim 1, wherein the accuracy index is associated with a position accuracy range, or a velocity accuracy range or a combination of position accuracy range and velocity accuracy range.

4. The method of claim 1 further comprising:
storing the PVT fix in a memory.

5. The method of claim 1 further comprising:
estimating a sleep time interval until a beginning of a new tracking window for obtaining a next PVT fix.

6. The method of claim 1 further comprising:
operating the GPS receiver in a one-shot PVT fix mode.

7. The method of claim 1, wherein the regular time or space interval is programmable by the host.

8. The method of claim 1, wherein the plurality of tracking profiles comprises a continuous tracking profile, a low power intermittent tracking profile, a background intermittent tracking profile, and a high-accuracy intermittent tracking profile.

9. The method of claim 8, wherein the background intermittent tracking profile is associated with a deep sleep mode, in which the GPS receiver is powered down with an exception of the backup memory or the system memory, and the real time clock.

10. The method of claim 9, further comprising:
resuming the tracking of the GPS signal upon waking up from the deep sleep mode using the calibrated real time clock.

11. The method of claim 1, wherein a time period for powering-down the GPS receiver is adjustable based on a host triggered event.

12. The method of claim 1, wherein a time period for powering-down the GPS receiver is adjustable based on the determined environmental state.

* * * * *